United States Patent [19]

Dichter

[11] 4,142,883
[45] Mar. 6, 1979

[54] MACHINE FOR WORKING GLASS TUBES AND IN PARTICULAR FOR MAKING CONTAINERS FROM GLASS TUBES

[76] Inventor: Hans-Joachim Dichter, Sachsendamm 93, 1000 Berlin 62, Fed. Rep. of Germany

[21] Appl. No.: 875,316

[22] Filed: Feb. 6, 1978

Related U.S. Application Data

[63] Continuation of Ser. No. 758,935, Jan. 13, 1977, abandoned.

[30] Foreign Application Priority Data

Jan. 23, 1976 [DE] Fed. Rep. of Germany ....... 2602946

[51] Int. Cl.$^2$ ............................................. C03B 23/12
[52] U.S. Cl. ...................................... 65/276; 65/159; 65/280; 65/323; 221/11; 221/83; 221/105
[58] Field of Search ........................... 221/11, 83, 105; 65/159, 227, 276, 280, 323

[56] References Cited

U.S. PATENT DOCUMENTS 3,479,174  11/1969  Dichter .................................. 221/11

FOREIGN PATENT DOCUMENTS 837911  6/1960  United Kingdom ..................... 221/11

Primary Examiner—Arthur D. Kellogg
Attorney, Agent, or Firm—Parmelee, Johnson, Bollinger & Bramblett

[57] ABSTRACT

The invention relates to a machine for working glass tubes, with several chucks circulating on a common axis and sweeping past several processing stations, there being mounted above each chuck a stepwise rotating magazine storing several glass tubes, each tube resting by its lower end on a non-rotating supporting plate which has a hole for the glass tubes to fall through for engagement by the chuck therebelow, the machine having a switch which causes the magazine to rotate, one step at a time, each step corresponding to the distance between two neighbouring tubes, in order to bring the next glass tube to the hole, and wherein between the hole of the supporting plate and the chuck therebelow there is a mobile arrestor blade which allows the magazine to rotate stepwise without a tube falling through the hole, until the chuck is empty, whereupon the blade can disengage so that it no longer blocks the hole.

21 Claims, 24 Drawing Figures

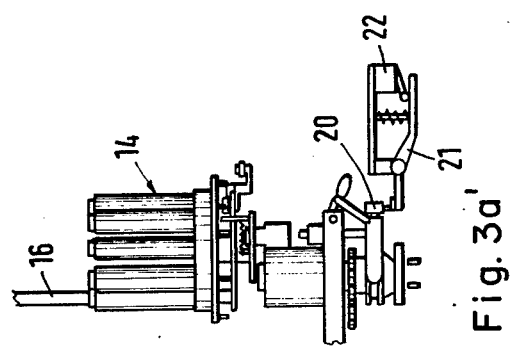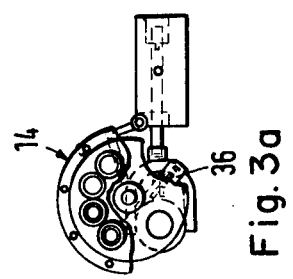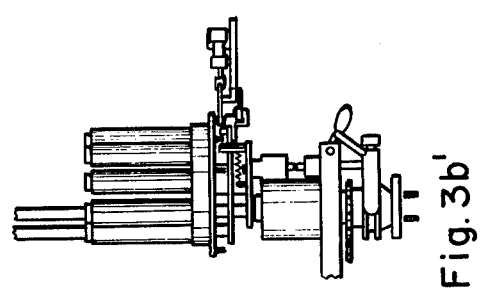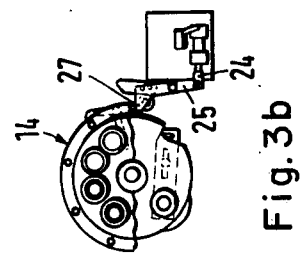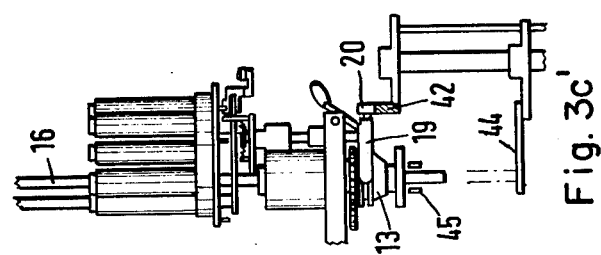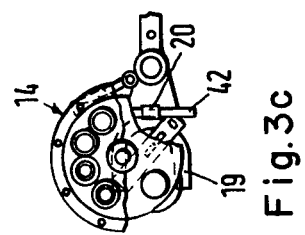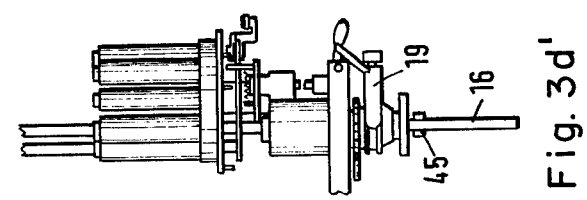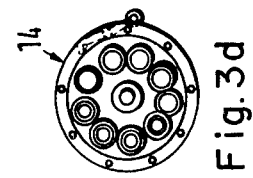

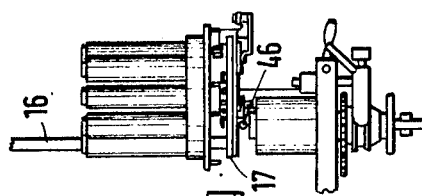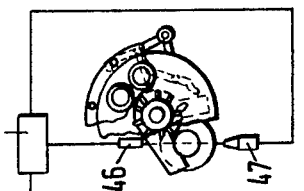
Fig.6a Fig.6a'
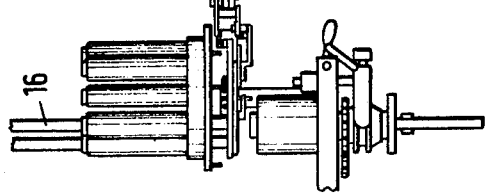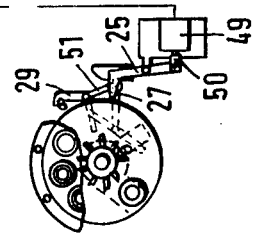
Fig.6b Fig.6b'
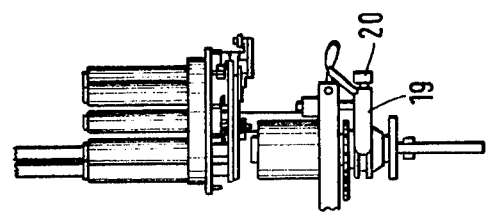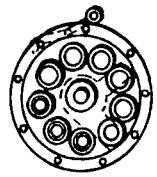
Fig.6c Fig.6c'
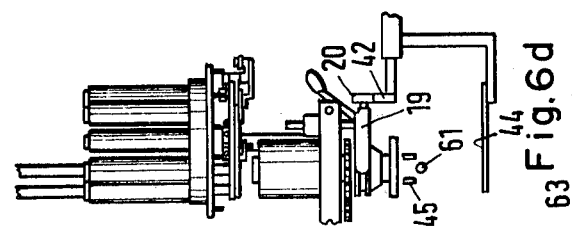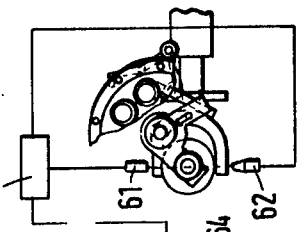
Fig.6d Fig.6d'
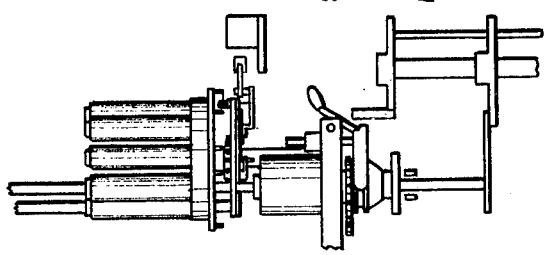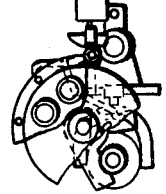
Fig.6e Fig.6e'
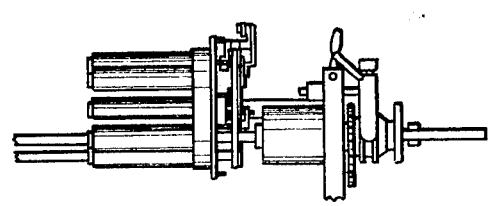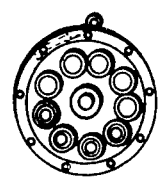
Fig.6f Fig.6f'

MACHINE FOR WORKING GLASS TUBES AND IN PARTICULAR FOR MAKING CONTAINERS FROM GLASS TUBES

This is a continuation of application Ser. No. 758,935 filed Jan. 13, 1977 now abandoned.

The invention relates to a machine for working glass tubes and in particular for making containers from glass tubes, with several chucks circulating around a common axis and sweeping past several processing stations, there being mounted above each chuch a stepwise rotating magazine storing several glass tubes, each tube resting by its lower end on a non-rotating supporting plate which has a hole for the glass tubes to fall through, the machine having a switch which causes the magazine to rotate, one step at a time, each step corresponding to the distance between two neighboring tubes, in order to bring the next glass tube to the hole.

A machine of this general kind is known in which the stepwise rotation of the magazine and the feeding of the glass tube to the chuck are both done in one operation, that is to say, the magazine brings a glass tube over the opening in the supporting plate, the tube thereupon falling downwards into the chuck (German patent Specification No. 1,293,972). But this arrangement is not entirely satisfactory in that the double operation, that is to say the rotation of the magazine through one step and the lowering of the glass tube into the chuck, takes a considerable length of time and limits the speed of operation of the machine.

The intention of the present invention is to provide a glass-working machine of the kind mentioned at the beginning, but in which the working speed of the machine is considerably increased, or the machine can have a greater number of chucks, without this impairing the smoothness of the chuck-feeding process or reducing the economic efficiency of the machine.

The problem is solved according to the invention in that between the hole of each supporting plate and the chuck below there is a mobile arrestor blade which allows the magazine to rotate stepwise without a tube falling through the hole, until the chuck is empty, whereupon the blade can disengage so that it no longer blocks the hole.

The machine according to the invention has the advantage that the two operations, the stepwise rotation of the magazine and the feeding of the glass tube to the chuck, take place independently of each other. In particular, the magazine can be rotated stepwise, if desired, long before the tube is fed into the chuck. Consequently, the entire distance between two processing stations can be utilized to the full in feeding the glass tube to the chuck. All the glass tube, which is already in position, has to do is fall down into the chuck and this effect is produced simply by releasing the arrestor blade which has been supporting the lower end of the glass tube.

The invention will now be described in greater detail on the basis of the two examples represented in the drawing, in which.

Figure 1:
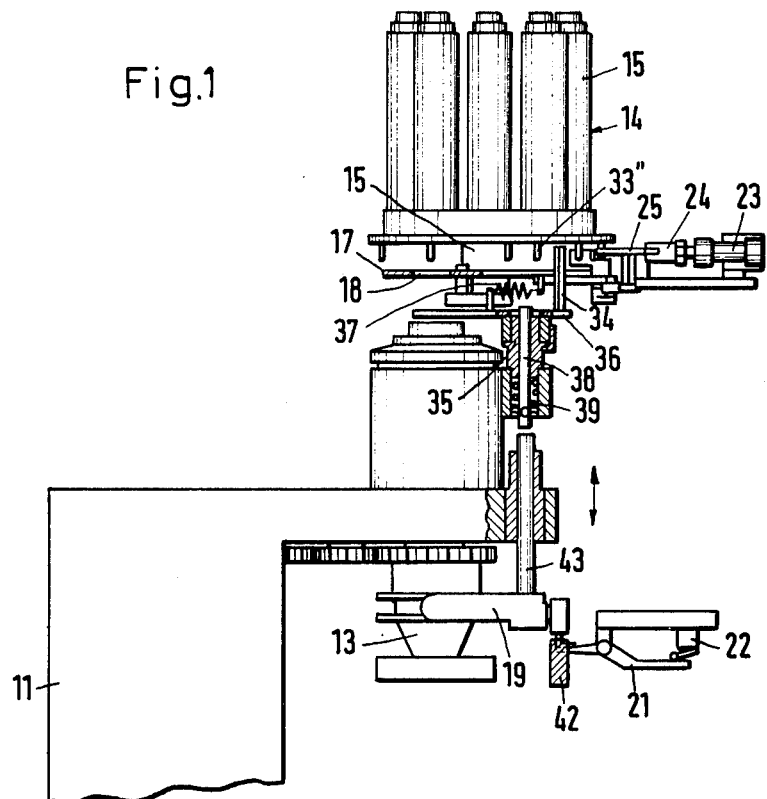
FIG. 1 is a side view of a chuck of a glass-working machine, the drawing also showing the stepwise rotating magazine for the glass tubes.
Figure 4:
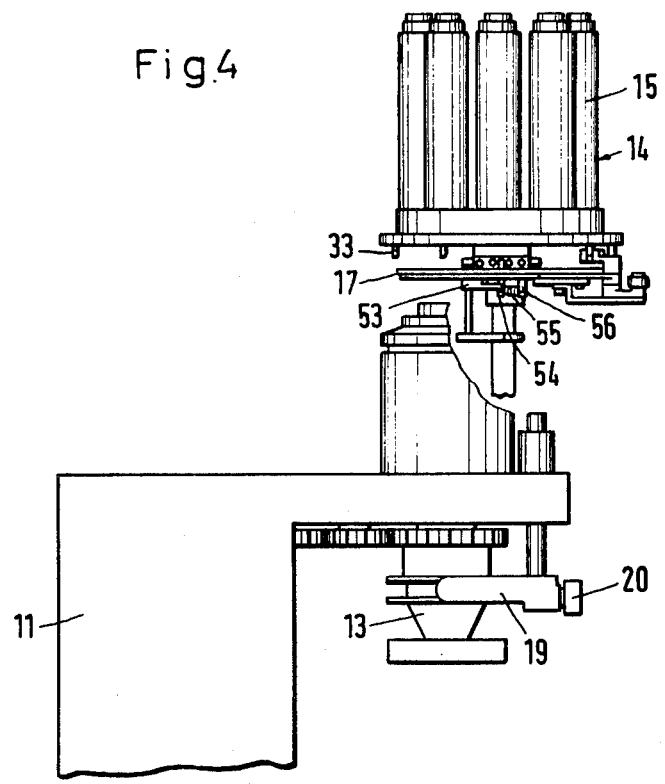
Figure 5:
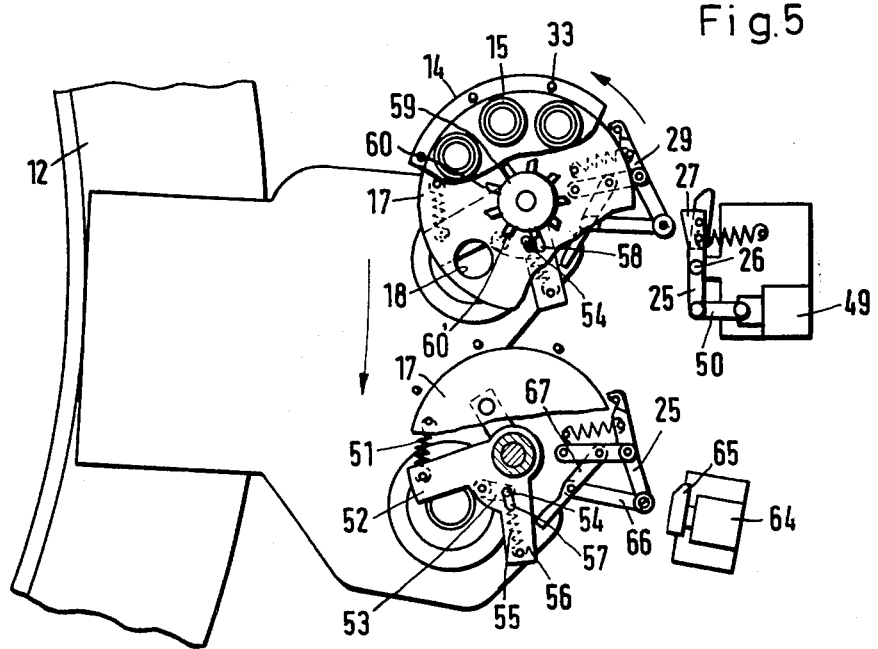

FIGS. 3(a') through 3(d') illustrate side views of the machine showing the positions of certain parts of the magazine during several phases of operation and FIGS. 3(a) through 3(d) show the top views corresponding to FIGS. 3(a') through 3(d');

FIG. 4 is a side view corresponding to FIG. 1, but showing a different version of the machine;

FIG. 5 is a plan view of a portion of this machine;

FIGS. 6(a') through 6(f') show top views of the machine of FIGS. 4 and 5. Specifically, FIGS. 6(a') through 6(f') show how the machine senses the presence or absence of a glass tube and reacts accordingly.

FIGS. 6(a) through 6(f) are side views corresponding to the respective positions of the machine shown in FIGS. 6(a') through 6(f').

Figure 2:
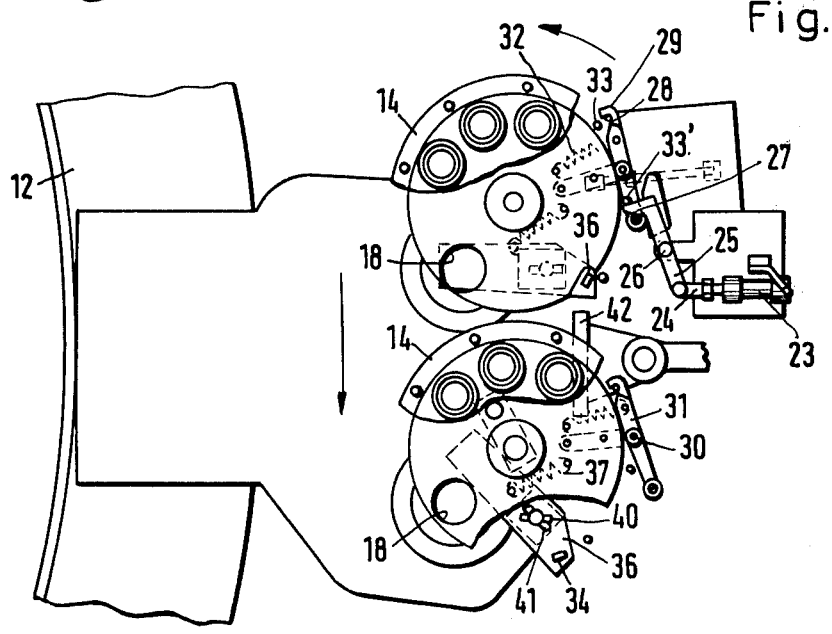
FIG. 2 is a plan view showing a circulating column with two chucks equipped with stepwise rotating magazines.

FIGS. 1 and 2 show a column 11 mounted to circulate between processing stations on an annular supporting base 12. The upper end of the column supports two chucks 13, each of which supports a rotary magazine 14 and each magazine has nine receptacles 15 arranged on a circle, to take glass tubes 16, as shown best in FIG. 3. Each glass tube 16 rests with its lower end on a supporting plate 17 which is fixed in position on the column 11, that is to say it does not rotate. Each supporting plate has a hole 18 in line with the chuck 13, to allow the glass tube to fall through, when desired, into the chuck.

When the tube has fallen, the chuck 3 grips the upper end of the tube, in that a chuck-actuating fork 19 moves downwards. When this occurs a roller 20 mounted on the fork 19 pivots a switch lever 21, actuating a switch 22. This causes fluid under pressure to enter the forward portion of a cylinder 23, retracting a piston 24 and rotating anticlockwise a 2-armed lever 25, which rotates on a pivot pin 26.

This brings the 2-armed lever 25 into the position shown in FIG. 2. In this movement a nose 27 of the 2-armed lever 25 has rotated clockwise a further 2-armed lever 31, which pivots on a pivot pin 30, the 2-armed lever 31 rotating against the influence of a spring 32. The other arm 29 of the 2-armed lever 31 has a notch 28 capable of locking in position one of the magazine pins 33 fixed to the undersurface of the rotary magazine 14. The clockwise rotation of the 2-armed lever 31 releases the magazine pin 33 from the notch 28.

The column 11 is travelling, in its circulating movement, so that another magazine pin 33' thrusts against the end face of the nose 27. With the travelling movement of the column 11 the rotary magazine 14 is therefore compelled to rotate anticlockwise through one step, the shape of the nose 27 being arranged so that at the end of this step the magazine pin 33' disengages from the nose. When the rotary step of the magazine has been completed, the two 2-armed levers rotate back into their initial positions, the arm 29 moving inwards, under the influence of the spring 32, so that the notch 28 engages with the magazine pin 33', locking it in position.

During the rotational step of the magazine 14 a magazine pin 33", engaging with the blade actuator pin 34 of a pivoted arrestor blade 36 has rotated the blade anticlockwise, against the influence of its return spring 37, so that the blade now blocks the hole 18, as indicated in broken lines in the upper portion of FIG. 2. The arrestor blade 36 pivots on a pivot sleeve containing a sliding rod 38 influenced by a compression spring 39. On the upper end of the sliding rod 38 is mounted a locking head 40 which engages in a lock-slot 41 in the arrestor blade 36. When the rotational step of the magazine 14 has been completed, the lower end of one of the glass tubes is resting on the upper surface of the arrestor blade 36.

The lowering of a glass tube into an empty chuck 13 takes place as follows: With continued travelling of the column 11 the roller 20 of the chuck-actuating fork 19 rolls up on a stationary edge-cam 42, which lifts the fork so as to open the chuck. The fork in turn lifts a pushrod 43 and this lifts the sliding rod 38, against the influence of its compression spring 39. This disengages the locking head 40 from the lock-slot 41 in the arrestor blade 36, which consequently snaps open under the influence of its spring 37, so that the glass rod can fall through the opening 18 and down into the empty chuck.

FIG. 3a shows the positions of the parts represented in FIGS. 1 and 2, at the beginning of the stepping movement of the magazine.

FIG. 3b shows the parts during the stepping movement.

FIG. 3c represents the opening of the chuck by the edge-cam 42. It will be observed that the glass tube falls through the chuck until the lower end of the glass tube comes to rest on a lower supporting plate 44. In FIG. 3c the chuck jaws 45 are shown open. As soon as the roller 20 leaves the edge-cam 42, the chuck-actuating fork 19 moves downwards, causing the chuck jaws 45 to grip the glass tube 16, as shown in FIG. 3d.

In FIG. 2 the magazine 14 rotates through one step and then, when the next processing station is reached, the arrestor blade 36 snaps open. But these two processes need not necessarily take place at two successive processing stations. On the contrary, the rotation of the magazine can take place at any desired processing station anywhere on the periphery of the machine.

In the versions shown in FIGS. 4 to 6 corresponding parts have been given the same index numbers as in FIGS. 1 to 3.

Here again the machine is arranged so that once the upper end of a glass tube, after processing at a station, has moved downwards clear of the supporting plate 17, the magazine can be rotated at any subsequent operational station around the periphery of the glass-working machine. The fact that the upper end of the tube has descended to below the supporting plate 17 is detected by a senser 46 which can, if desired, be a photocell device, as represented in FIG. 6a. If no glass tube is present, the senser actuates a switch 48, which energizes a solenoid 49, which retracts its piston 50. The piston 50 rotates the 2-armed lever 25 anticlockwise, so that the arm 29 moves outwards, allowing the magazine 14 to rotate one step.

In this version of the invention the magazine 14 has an arrestor blade 52 which is centrally pivoted and influenced by a return spring 51. Pivoted on the undersurface of the arrestor blade 52 is a lever 53 whose outer end supports a locking pin 54 which is connected by a spring 55 to an arm 56 of the arrester blade 52. The locking pin 54 works in a lock-slot 57 in the arm 56 of the arrestor blade. Furthermore, the upper end of the locking pin 54 engages in a curved slot 58 in the supporting plate 17.

On the central shaft of the magazine 14 is fixed a bush 59 equipped with radially projecting switching tangs 60.

If the magazine 14 is now rotated through one step, as already described for the device of FIGS. 1 to 3, one of the switching tangs 60' moves the locking pin 54 anticlockwise and also radially outwards, due to the shape of the tang 60'. This brings the locking pin 54 into a locking portion of the curved slot 58, where it is retained by the spring 55.

With the locking pin 54 in this position, the arrestor blade 52 blocks the hole 18, as shown in FIGS. 6b to 6d.

With further travel of the column 11 the chuck 13 reaches the station where the glass tube should fall into the chuck. A sensor 61 with a light source 62 senses that the chuck is empty, as shown in FIG. 6d. The chuck jaws 45 are open, due to the action of the edge cam 42. The senser 61 closes a switch 63, energizing a solenoid 64, which advances an actuator head 65, pivoting the 2-armed lever 25 clockwise and pivoting a lever 67 whose other end shifts the locking pin 54, against the influence of its spring 55, removing the locking pin from the locking portion of the curved slot 58 in the supporting plate 17. The return spring 51 therefore snaps the arrestor plate 52 into its open position and the glass tube 16 falls downwards until its lower end comes to rest on the lower supporting plate 44 (compare FIG. 6d). Then the roller 20 of the chuck-actuating fork 19 leaves the edge-cam 42 and the fork moves downwards, closing the chuck jaws on the glass tube (compare FIG. 6f).

Both the versions of the invention described above have the advantage that the stepwise rotation of the magazine can be functionally separated from the feeding of the glass tube into the chuck. And the stepping of the magazine can take place at any processing station around the periphery of the machine. This considerably shortens the period of time required for feeding the chuck.

I claim:

1. A machine for working glass tubes, including several chucks circulating on a common axis and sweeping past several processing stations, said machine comprising a stepwise rotating magazine storing several glass tubes, each of said tubes resting by its lower end on a non-rotating supporting plate which has a hole for the glass tubes to fall through for engagement by the chuck therebelow, said stepwise rotating magazine mounted above each of said chucks, said machine having means for rotating said magazine one step at a time, each step corresponding to the distance between two neighbouring tubes to bring the next glass tube to the hole, and a switch, said switch cooperating with said means for rotating said magazine, a mobile arrestor blade positioned between the hole of the supporting plate and said chuck therebelow, means for rotating said mobile arrestor blade, wherein said arrestor blade cooperates with said means for rotating said arrestor blade stepwise to block said hole in said supporting plate to prevent one of said tubes from falling through said hole in said supporting plate until said chuck is empty, and means for disengaging said arrestor blade so that it no longer blocks said hole when said chuck is empty.

2. A machine according to claim 1, wherein the arrestor blade is pivoted on a pivot sleeve containing a sliding rod equipped with a locking head which engages in a lock-slot in the arrestor blade, the sliding rod sliding axially to disengage its head from the lock-slot, so as to release the blade.

3. A machine according to claim 2, wherein the sliding rod is in line with a push-rod mounted on a chuck-actuating fork which actuates the chuck.

4. A machine according to claim 1 wherein the magazine is equipped with actuating devices for rotating the arrestor blade into its blocking position.

5. A machine according to claim 4, wherein the actuating devices are magazine pins fixed to the magazine for propelling it stepwise around, the arrestor blade having a blade actuator pin which co-operates at each step with a magazine pin, the blade actuator pin then moving out of the path of the magazine pins.

6. A machine according to claim 4, wherein the devices for driving the magazine stepwise in rotation are radially outwards projecting tangs capable of shifting a locking pin pivoted to the arrestor blade into its locking position.

7. A machine according to claim 6, wherein the locking pin works in a lock-slot in the arrestor blade and also works in a curved slot in the supporting plate, the curved slot having a locking portion into which the locking pin is pulled by a spring.

8. A machine according to claim 7, wherein a lever actuated by a solenoid is provided for unlocking the locking pin.

9. A machine for working glass tubes, with several chucks circulating on a common axis and sweeping past several processing stations, there being mounted above each chuck a stepwise rotating magazine storing several glass tubes, each tube resting by its lower end on a non-rotating supporting plate which has a hole for the glass tubes to fall through for engagement by the chuck therebelow, the machine having a switch which causes the magazine to rotate, one step at a time, each step corresponding to the distance between two neighbouring tubes, in order to bring the hole of the supporting plate and the chuck therebelow there is a mobile arrestor blade which allows the magazine to rotate stepwise without a tube falling through the hole, until the chuck is empty, whereupon the blade can disengage so that it no longer blocks the hole; wherein said arrestor blade comprises a pivoted lever which can be rotated into its blocking position, against the influence of a return spring, during each one-step rotation of the magazine.

10. A machine according to claim 9, wherein the arrestor blade can be locked in its blocking position by a locking device.

11. A machine according to claim 10, wherein the locking device can be unlocked by a device which responds when the chuck is empty.

12. A machine according to claim 9, wherein the magazine is equipped with actuating devices for rotating the arrestor blade into its blocking position.

13. A machine according to claim 12, wherein the actuating devices are magazine pins fixed to the magazine for propelling it stepwise around, the arrestor blade having a blade actuator pin which co-operates at each step with a magazine pin, the blade actuator pin then moving out of the path of the magazine pins.

14. A machine according to claim 12, wherein the devices for driving the magazine stepwise in rotation are radially outwards projecting tangs capable of shifting a locking pin pivoted to the arrestor blade into its locking position.

15. A machine according to claim 14, wherein the locking pin works in a lock-slot in the arrestor blade and also works in a curved slot in the supporting plate, the curved slot having a locking portion into which the locking pin is pulled by a spring.

16. A machine according to claim 15, wherein a lever actuated by a solenoid is provided for unlocking the locking pin.

17. A machine according to claim 9 wherein the arrrestor blade is pivoted on a pivot sleeve containing a sliding rod equipped with a locking head which engages a lock-slot in said arrestor blade, said sliding rod sliding axially to disengage said locking head from said lock-slot, thereby releasing said blade.

18. A machine according to claim 17 wherein said sliding rod is in line with a push-rod mounted on a chuck-actuating fork which activates said chuck.

19. A machine for working glass tubes, including several chucks circulating on a common axis and sweeping past several processing stations, said machine comprising a stepwise rotating magazine storing several glass tubes, each of said tubes resting by its lower end on a non-rotating supporting plate which has a hole for the glass tubes to fall through for engagement by the chuck therebelow, said stepwise rotating magazine mounted above each of said chucks, said machine having means for rotating said magazine one step at a time, each step corresponding to the distance between two neighbouring tubes to bring the next glass tube to the hole, and a switch, said switch cooperating with said means for rotating said magazine, a mobile arrestor blade positioned between the hole of the supporting plate and said chuck therebelow, means for moving said mobile arrestor blade, wherein said arrestor blade cooperates with said means for moving said arrestor blade to block said hole in said supporting plate to prevent one of said tubes from falling through said hole in said supporting plate until said chuck is empty, and means for disengaging said arrestor blade so that it no longer blocks said hole when said chuck is empty.

20. In a machine for working glass tubes of the type including several chucks circulating on a common axis and sweeping past several processing stations, said machine comprising a stepwise rotating magazine storing several glass tubes, each of said tubes resting by its lower end on a non-rotating supporting plate which has a hole for the glass tubes to fall through for engagement by the chuck therebelow, said stepwise rotating magazine mounted above each of said chucks, said machine having means for rotating said magazine one step at a time, each step corresponding to the distance between two neighbouring tubes to bring the next glass tube to the hole, and a switch, said switch cooperating with said means for rotating said magazine, the improvement comprising a mobile arrestor blade positioned between the hole of the supporting plate and said chuck therebelow, means for rotating said mobile arrestor blade, wherein said arrestor blade cooperates with said means for rotating said arrestor blade stepwise to block said hole in said supporting plate to prevent one of said tubes from falling through said hole in said supporting plate until said chuck is empty, and means for disengaging said arrestor blade so that it no longer blocks said hole when said chuck is empty.

21. In a machine for working glass tubes of the type including several chucks circulating on a common axis and sweeping past several processing stations, said machine comprising a stepwise rotating magazine storing several glass tubes, each of said tubes resting by its lower end on a non-rotating supporting plate which has a hole for the glass tubes to fall through for engagement by the chuck therebelow, said stepwise rotating magazine mounted above each of said chucks, said machine having means for rotating said magazine one step at a time, each step corresponding to the distance between two neighbouring tubes to bring the next glass tube to the hole, and a switch, said switch cooperating with said means for rotating said magazine, the improvement comprising a mobile arrestor blade positioned between the hole of the supporting plate and said chuck therebelow, means for moving said mobile arrestor blade, wherein said arrestor blade cooperates with said means for moving said arrestor blade to block said hole in said supporting plate to prevent one of said tubes from falling through said hole in said supporting plate until said chuck is empty, and means for disengaging said arrestor blade so that it no longer blocks said hole when said chuck is empty.

* * * * *

UNITED STATES PATENT OFFICE
CERTIFICATE OF CORRECTION

Patent No. 4,142,883     Dated   March 6, 1979

Inventor(s)  Hans-Joachim Dichter

It is certified that error appears in the above-identified patent and that said Letters Patent are hereby corrected as shown below:

Column 1, Line 12:  Change "chuch" to -- chuck --.

Column 1, Line 25:  Change "patent" to -- Patent --.

Column 2, Line 27:  Change "3" to -- 13 --.

Column 3, Line 55:  Change "outer" to -- other --.

Signed and Sealed this

Nineteenth Day of June 1979

[SEAL]

Attest:

RUTH C. MASON
Attesting Officer

DONALD W. BANNER
Commissioner of Patents and Trademarks